United States Patent [19]
Lastinger

[11] Patent Number: 5,806,685
[45] Date of Patent: Sep. 15, 1998

[54] CONFINEMENT HOUSE CLEANER

[75] Inventor: Anthony Wilburn Lastinger, Chula, Ga.

[73] Assignee: Kelley Manufacturing Company, Tifton, Ga.

[21] Appl. No.: 565,452

[22] Filed: Feb. 1, 1996

[51] Int. Cl.$^6$ .................................................. B07B 1/00
[52] U.S. Cl. .................... 209/678; 209/235; 209/394; 241/101.741; 241/101.742
[58] Field of Search .................. 209/675, 677, 209/678, 393, 394, 235; 241/101.2, 101.741, 101.742

[56] References Cited

U.S. PATENT DOCUMENTS

| | | | |
|---|---|---|---|
| 1,659,899 | 2/1928 | Smith | 209/394 |
| 1,960,857 | 5/1934 | Stoltenberg | 209/678 |
| 3,279,601 | 10/1966 | James | 209/678 |
| 4,711,403 | 12/1987 | Gregory, Sr. et al. | 241/101.2 |
| 4,897,183 | 1/1990 | Lewis, Jr. et al. | 209/235 |
| 5,421,108 | 6/1995 | Stewart | 209/678 |

*Primary Examiner*—Karen B. Merritt
*Assistant Examiner*—Gregory A. Morse
*Attorney, Agent, or Firm*—Veal & Associates

[57] ABSTRACT

An apparatus for use in cleaning confinement houses, to be pulled within the confinement house by a small tractor, providing motive force to the apparatus and to its components, is constructed on a wheeled frame, the front of which is connected to the tractor in a manner that allows the height of the leading edge of the apparatus to be adjusted. The leading edge of the frame carries a feeder reel which breaks up the mass of litter and waste on the floor and lifts it to an inclined conveyor. The conveyor is a bar type conveyor in which a plurality of parallel bars are mounted transverse to the direction of travel of the conveyor to urge material along a fixed grate having interstitial separation of such size as to allow sifting of reusable litter from waste litter which is too soiled to be reused. A plurality of panels may be detachably affixed to the grate beneath the bar conveyor thereby allowing the user to determine the amount of reusable material returned to the floor. A hopper is mounted to the frame directly behind the discharge of the inclined conveyor, such that material not returned to floor is deposited into the hopper. The drive elements are all mounted on one side of the frame thereby allowing minimal clearance between the apparatus and an adjacent wall or partition.

15 Claims, 4 Drawing Sheets

CONFINEMENT HOUSE CLEANER

FIELD OF THE INVENTION

The present invention relates to the field of animal husbandry and more particularly to the portion of said field directed to confinement houses. In greater particularity the present invention is directed toward poultry confinement houses wherein particulate matter is placed on the floor of such a house and periodically cleaned or replaced. In still further particularity the present invention is directed to the class of machines designed to recover all or part of the particulate matter from the confinement house and remove a selected portion of the particulate from the house.

BACKGROUND OF THE INVENTION

A persistent need exists in the poultry industry regarding the removal of litter and waste from the flooring of a confinement house used in the raising of poultry. This need is chronicled in the prior art patents to Lewis, U.S. Pat. No. 4,897,183 and Gregory U.S. Pat. No. 4,711,403. While each of the machines disclosed in the prior art was suitable for use, neither machine provides the efficiency of operation and economy of the present invention.

SUMMARY OF THE INVENTION

It is the object of the present invention to provide a confinement house cleaning apparatus that can selectively segregate reusable litter from unusable waste litter.

Another object of the invention is to provide a confinement house cleaning apparatus that can provide near 100 percent clean out of the house including area's near walls and partitions.

Still another object of the invention is to provide an apparatus which permits the user to select the amount of segregation of waste and litter to be accomplished. Yet another object of the invention is to provide a machine which can be used to selectively disperse waste removed from a confinement house.

A further object of the invention is to provide an apparatus that can be selectively positioned to remove only particulate matter from the floor of a confinement house above a selected level.

These and other objects and advantages of the present invention are accomplished in the novel construction of the apparatus, which combines proven components in an advantageous manner. As will be understood the apparatus is to be pulled within the confinement house by a small tractor providing motive force to the apparatus and to its components.

The apparatus is constructed on a wheeled frame, the front of which is connected to the tractor in a manner that allows the height of the leading edge of the apparatus to be adjusted. The leading edge of the frame carries a feeder reel which breaks up the mass of litter and waste on the floor and lifts it to an inclined conveyor. The conveyor is a bar type conveyor, that is to say, one in which a plurality of parallel bars are mounted transverse to the direction of travel of the conveyor to urge material along a subjacent surface. In the instant apparatus the subjacent surface comprises a fixed grate having interstitial separation of such size as to allow sifting of reusable litter from waste litter which is too soiled to be reused. A plurality of panels may be detachably affixed to the grate beneath the bar conveyor such that all or a selected portion of the subjacent surface is solid, thereby allowing the user to determine the amount of reusable material returned to the floor. A hopper is mounted to the frame directly behind the discharge of the inclined conveyor, such that material not returned to floor is deposited into the hopper. A longitudinal conveyor is mounted in bottom of the hopper an serves a dual purpose to disperse the waste particulate in the hopper and to discharge the contents of the hopper through a rear metering gate. Preferentially, a spreader mechanism at the rear of the frame will disperse discharged particulate horizontally.

Of particular note is the design of the drive elements which are all mounted on one side of the frame thereby allowing minimal clearance between the apparatus and an adjacent wall or partition. This feature coupled with an offset hitch capability allows a user to remove litter from the floor over a larger percentage of the floor than heretofore possible.

A fuller understanding of the invention is provided by a study of the description of the preferred embodiment with reference to the appended drawings.

BRIEF DESCRIPTION OF THE DRAWINGS

Apparatus embodying features of my invention are depicted in the accompanying drawings which form a portion of this disclosure and wherein.

DESCRIPTION OF THE PREFERRED EMBODIMENT

Figure 1:
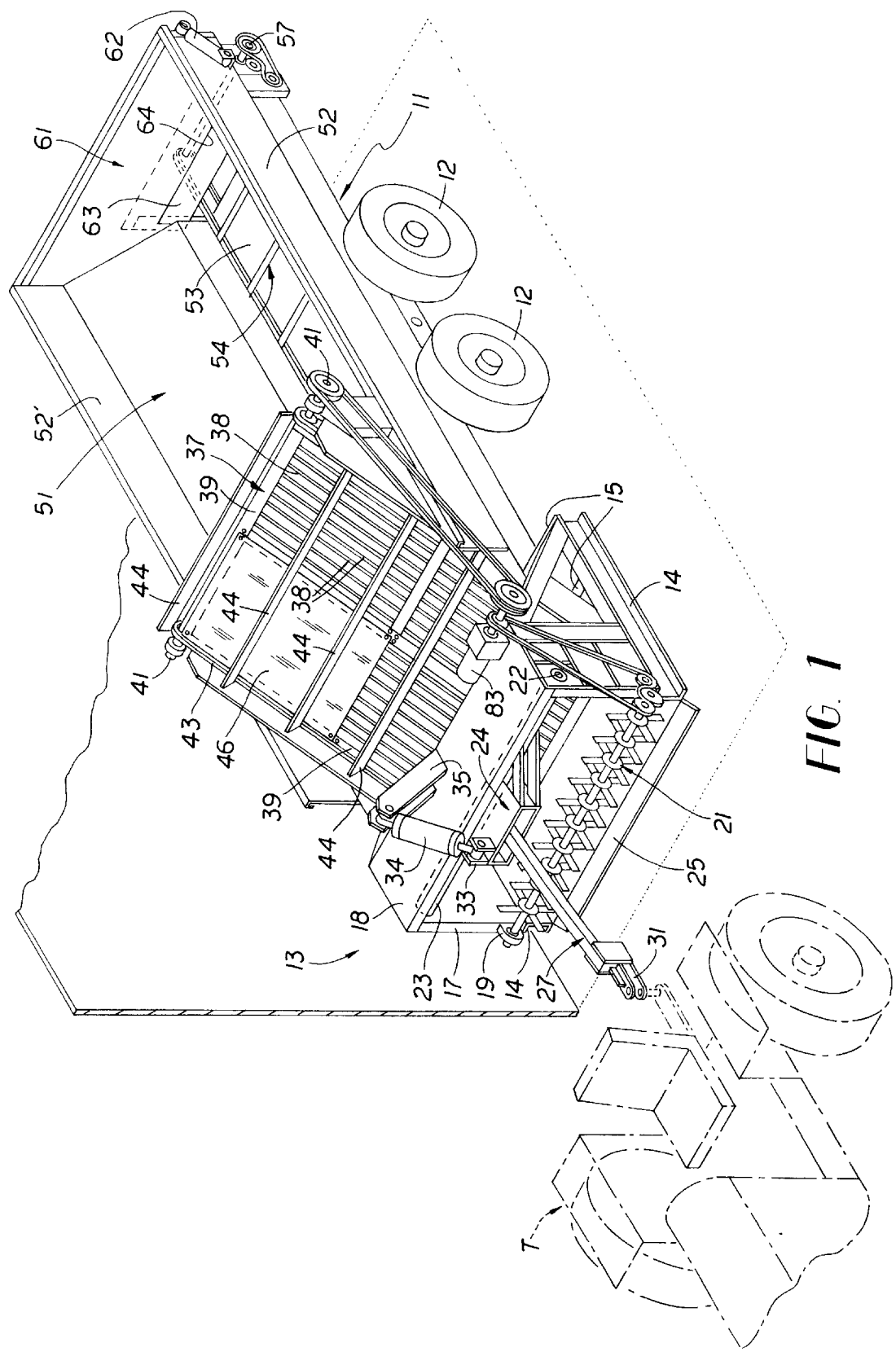
FIG. 1 is perspective view of the house cleaner showing the associated tractor in phantom and a wall of the confinement house.
Figure 2:
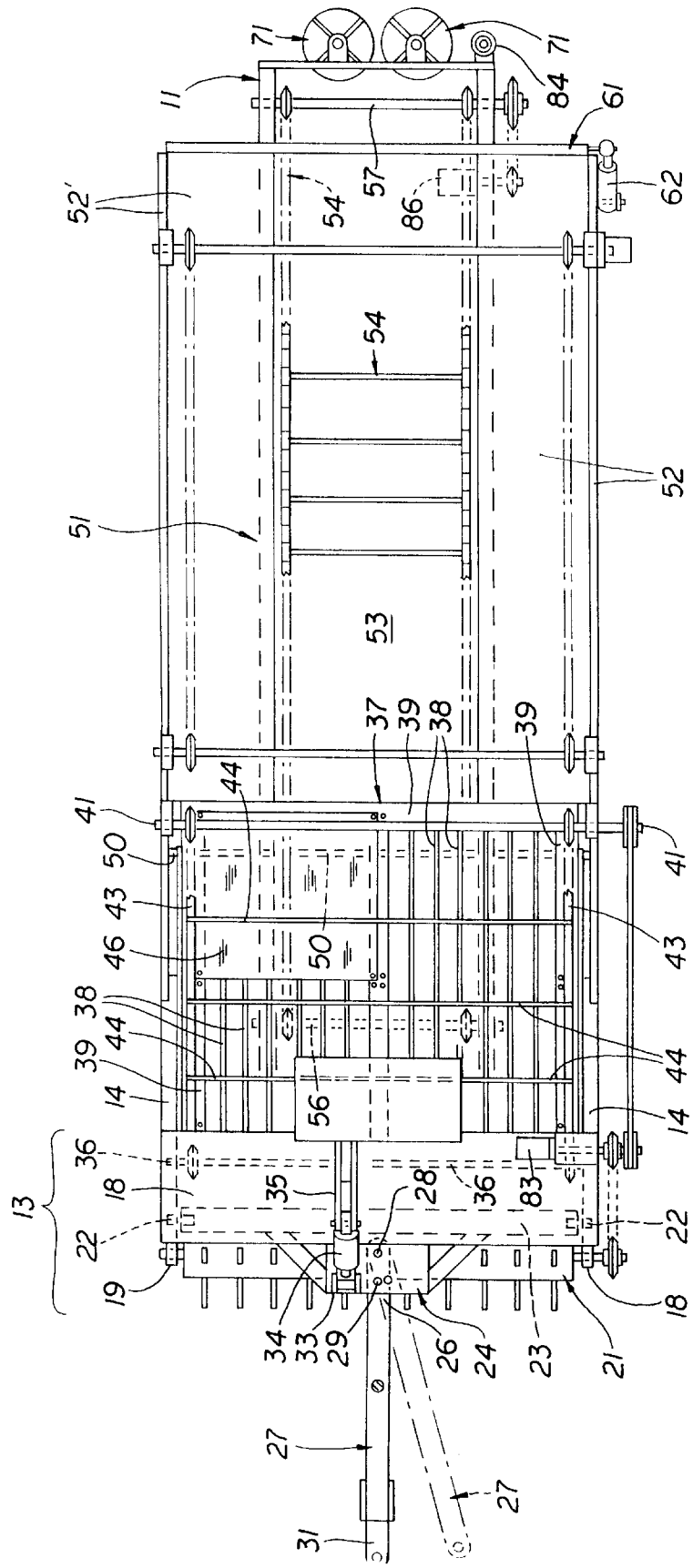
FIG. 2 is a plan view of the house cleaner.
Figure 3:
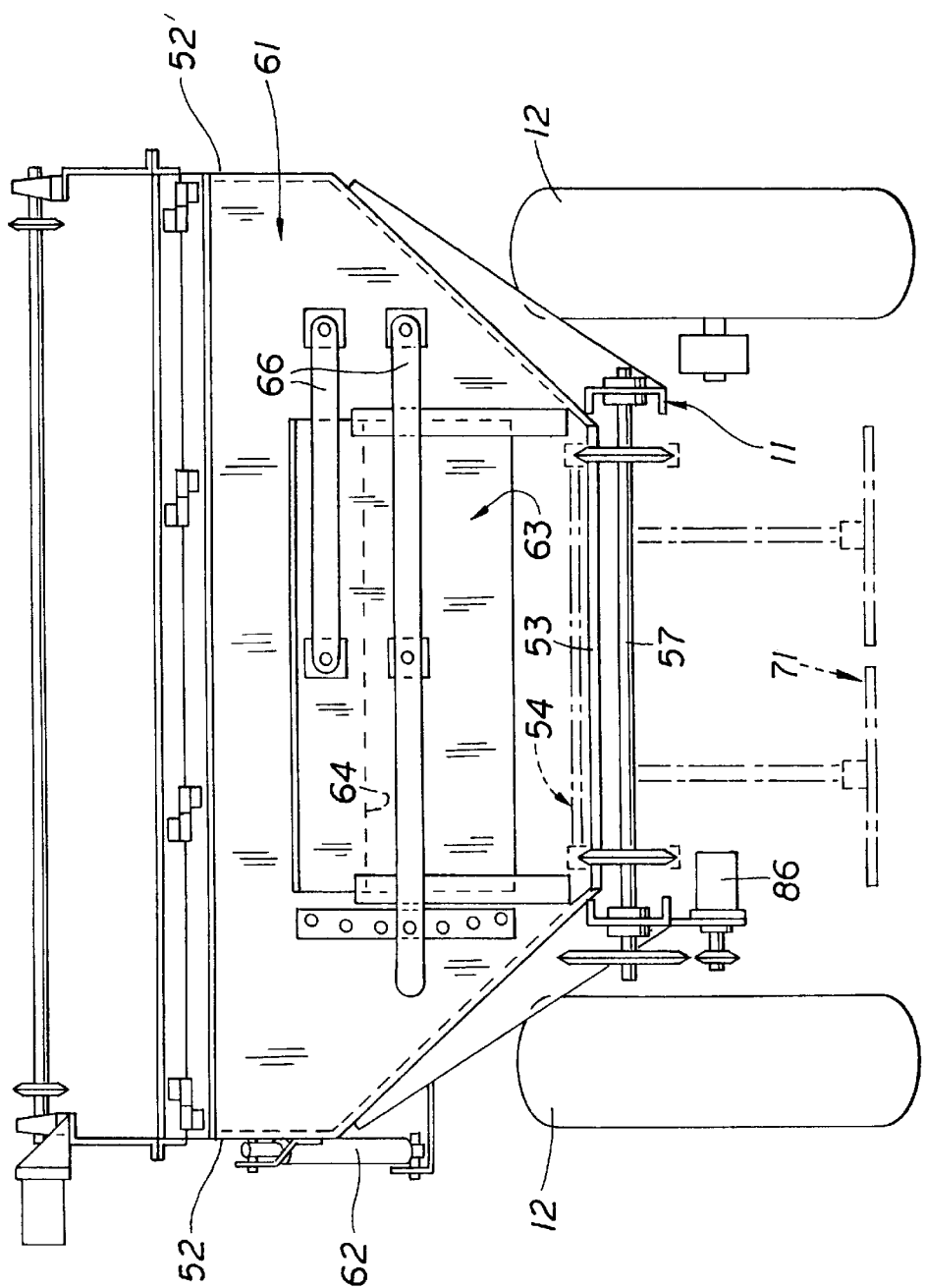
FIG. 3 is rear elevational view of the cleaner showing the gate partially raised; and, FIG. 4 is a side elevational view of the house cleaner.
Figure 4:
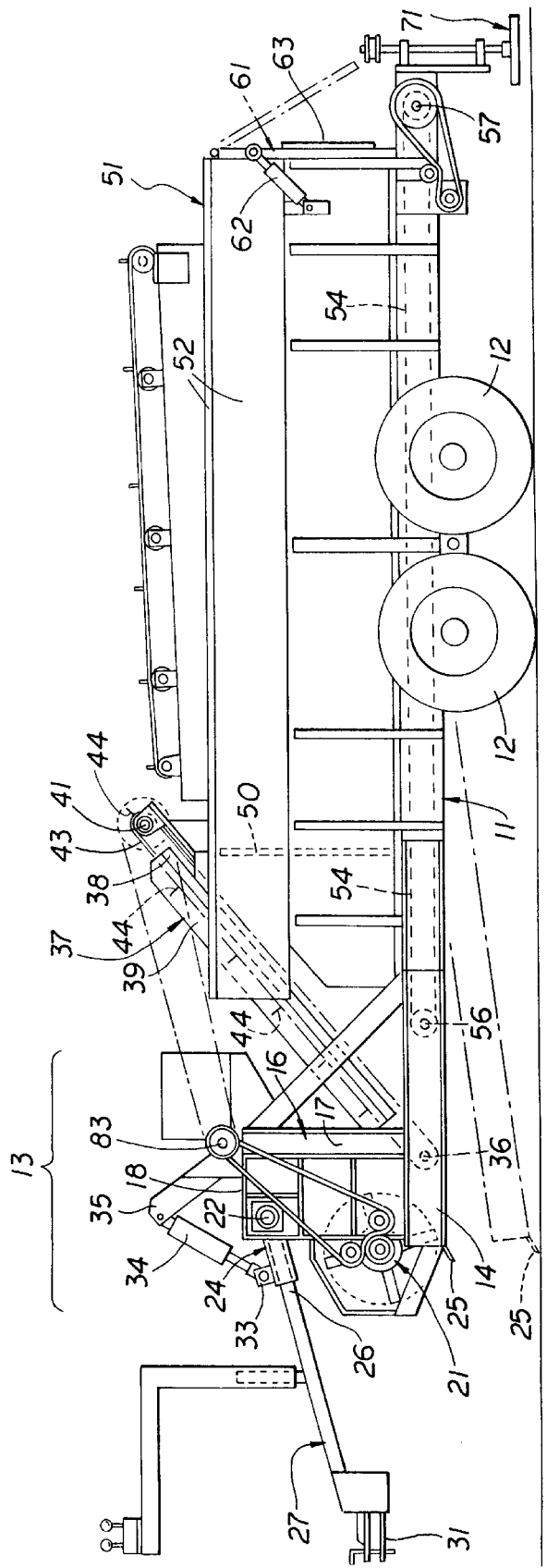

Referring to the Drawings for a clearer understanding of the invention, it may be seen in FIG. 1 that the apparatus is a movable recovery machine supported on a frame 11 over a set of wheels 12 which may be tandem or single wheels. The frame extends longitudinally to a forward assembly 13 where laterally spaced stringers 14 and transverse struts 15 provide a widened chassis. Affixed to the leading edge of the stringers 14 is a vertical frame extension 16 including riser weldments 17 and a transverse plate 18. Affixed to the riser weldments 17 are pillow blocks 19 for mounting a transverse feeder reel 21 for rotation about a horizontal axis. Affixed to the frame and extending partially below feeder reel 21 is a scraper blade 25.

Mounted in the riser weldments above and rearwardly of the pillow blocks 19 are opposing pivot assemblies 22 which support a tube 23. Affixed to and extending forwardly from tube 23 is an upper tongue weldment 24 defining a forwardly opening receptacle for a first end 26 of a lower tongue 27. Lower tongue 27 is retained in upper tongue weldment 24 by a vertical pin 28 extending through both members. A positioning pin 29 may be inserted through apertures in the weldment 24 and lower tongue 27 to offset the lower tongue from the centerline of the upper tongue weldment and the frame 11. Lower tongue 27 terminates in an attachment clevis 31 for pinned connection to a tractor T in a conventional manner.

Affixed to upper tongue weldment 24 is an upwardly opening control clevis 33. Affixed to clevis 33 is a lower end of a linear actuator 34 which is affixed at its other end to an arm 35 extending upwardly from transverse plate 18. Variation of the elongation of the linear actuator causes the inclination of the upper and lower tongues to vary and thereby raises or lowers the height of the leading edge of the frame relative to the pinned connection to the tractor. This allows the operator to adjust the height of the apparatus at the scraper blade 25 relative to the flooring of the confinement house.

An idler axle 36 is mounted transversely within stringers for rotation about its longitudinal axis. Supported on the chassis and extending upwardly and rearwardly from proximal idler axle 36 is an inclined conveyor frame 37, which includes a grate 38 and support members 39. Grate 38 may be expanded metal or preferentially a plurality of spaced apart rods extending along the angle of inclination of the conveyor frame 37. At the upper end of conveyor frame 37 a drive axle 41 is supported. A bar conveyor, comprising a set of parallel endless chains 43 and a plurality of spaced apart flights 44 extending between chains, is mounted on drive axle 41 and idler axle 36 such that the flights are urged upwardly along the upper surface of grate 38. Grate 38 or support members 39 are provided with a plurality of threaded apertures such that a plurality plates 46 may be detachably affixed over all or a portion of grate 38 to vary the surface area exposed of the grate exposed to the upward travel of the flights 44.

Inclined conveyor frame 37 is supported on its upper end above a hopper 51. Hopper 51 is defined by a forward wall 50 and inclined side walls 52 and 52' which extend outwardly and upwardly from frame 11 above wheels 12. The lower edge of each side wall 52, 52' terminates at a bottom plate 53. A bar conveyor 54 driven about axles 56 and 57 mounted in frame 11 has its upper run along the upper surface of bottom plate 53 and extends beyond the rear of the hopper 51. The rear of hopper 51 is defined by a dump door 61 hingedly mounted to the top of sidewalls 52,52' and extending downwardly to near bottom plate 53. A linear actuator 62 is mounted outwardly of side wall 52 and attaches to the dump door such that extension of the actuator will pivot the door outwardly about its hinged connection to the sidewalls. A metering gate 63 is mounted to door 61 and covers an opening 64 of approximately the same width as bar conveyor 54. A parallelogram linkage 66 allows the gate to be raised to a selected height within a set of guide channels on either side of the opening 64. The selected height acts as metering mechanism for discharge of material by conveyor 54.

Mounted below frame 11 and gate 63 is a spreader mechanism 71 which may be rotatably mounted driven disc's as shown or another mechanism such as a transverse bar conveyor. The spreader 71 receives material through opening 64 and disperses it laterally. A hydraulic motor 84 supplies power to the spreader 71.

In operation, the operator attaches lower tongue 27 to the tractor and attaches a hydraulic pump to the power take-off unit of the tractor. The pump draws fluid from a reservoir mounted to transverse plate 18 and passes it through standard hydraulic connections and filters to a drive motor 83 mounted on transverse plate 18 and connected by a chain drive to feeder reel 21, and motor 83 also drives axle 41 through belt 45 and pulleys 42, 42'. The pump also supplies fluid to a motor 84 for the spreader 71, a motor 86 for the bar conveyor 54 and any other actuators and motors needed on the apparatus. All of the hydraulic connections and drive sprockets and chains associated with the various components are mounted on the same side of frame 11 as sidewall 52 such that the side of the apparatus on which sidewall 52' is mounted is free from any protruding equipment and thus may be positioned closely adjacent any walls or partitions of the confinement house. Alternatively, additional hydraulic motors may be used to directly drive components of the instant invention in lieu of belts, chains, and gears. It should be noted that blade 25 and feeder reel 21 are mounted to the stringers 14 and extend approximately the same width as hopper 51 thus the apparatus is able to remove litter from closely adjacent the building structures. The operator adjusts linear actuator 34 to adjust the height of blade 25 and pulls the apparatus through the house to bring the blade 25 and feeder reel into contact with the litter and waste agglomerated on the flooring of the house such that the resulting litter and waste particulate is fed on to inclined conveyor frame 37. Depending on the degree of sifting of the particulate the operator may have affixed one or more of the plates 46 over grate 38. If all of the plates are affixed a total clean out operation is performed and all of the particulate litter is transferred into the hopper 51. If less than total clean out is desired part of the particulate falls between the interstices of grate 38 and is returned to the floor while the particulate which is too caked with waste is carried upwardly by flights 44 and deposited in hopper 51. The waste portion may be removed from the hopper by opening dump door 61 and actuating conveyor 54 or by setting metering gate 63 at a desired metering opening and actuating conveyor 54.

It should be appreciated that the present invention permits the operator to easily select total or partial clean out; the depth of cleaning to be performed; and facilitates wall to wall cleaning within the confinement house in a manner far more efficient than prior systems. Further, the discharge options available to remove the waste portion eliminates substantial labor in spreading or composting the waste material. Accordingly the present invention represents a substantial improvement over the known art.

While I have shown my invention in one form, it will be obvious to those skilled in the art that it is not so limited but is susceptible of various changes and modifications without departing from the spirit thereof.

What I claim is:

1. Apparatus for cleaning a confinement house wherein the flooring of such confinement house is littered with caked particulate matter to be removed therefrom and selectively segregated into a reusable component of between zero and one hundred percent of said particulate removed and a waste component of the balance of the particulate removed, comprising in combination:

a. a frame means extending longitudinally relative to the direction of motion for supporting a plurality of conveying means thereon for movement through said confinement house;

b. an inclined grate supported on said frame means;

c. detachable cover means affixed over said grate for selectively adjusting the area of said grate used in segregating said particulate in increments from zero percent to one hundred percent;

d. a bar conveyor constrained to travel in an endless loop having an upward run adjacent said grate such that particulate matter is urged upwardly along said grate;

e. means adjacent said grate mounted on said frame for lifting particulate matter from the flooring of said confinement house onto said bar conveyor and said grate; and, f. containment means supported on said frame rearwardly of said inclined grate for receiving a waste fraction of said particulate matter urged upwardly along said grate.

2. Apparatus as defined in claim 1 wherein said cover means comprises a plurality of plate like members each having an area less that the surface area of said grate and means for detachably affixing at least one of said plate like members over a selected portion of said grate.

3. Apparatus as defined in claim 2 wherein said grate comprises a plurality of parallel rods extending along the angle of inclination of said grate in spaced relation to one another such that a portion of said particulate matter of a predetermined size falls through interstices between said parallel rods.

4. Apparatus as defined in claim 3 wherein said bar conveyor comprises a plurality of spaced apart flights disposed perpendicular to said plurality of rods of said grate and movable in sliding relation over said grate and said plate like members.

5. Apparatus as defined in claim 4 wherein said containing means comprises a hopper having a bottom and a longitudinal conveyor extending along said bottom for dispersing said particulate matter deposited therein and a gate mounted at an end opposite said grate for removal of said waste portion.

6. Apparatus as defined in claim 5 wherein said bar conveyor and said longitudinal conveyor are driven about transverse axles, supported on said frame, by a plurality of belts and pulleys connecting said axles to a source of motive power, said belts and pulleys being mounted exclusively on a first longitudinal side of said frame.

7. Apparatus as defined in claim 6 wherein said means for lifting is supported in non contacting relation to said flooring and further comprising means affixed to said frame for varying the height of said means for lifting above said flooring.

8. Apparatus as defined in claim 5 comprising means mounted to said frame rearwardly of said gate in cooperative relation thereto for dispersing particulate matter urged through said gate by said longitudinal conveyor.

9. Apparatus as defined in claim 2 wherein said bar conveyor and said longitudinal conveyor are driven about transverse axles, supported on said frame, by a plurality of belts and pulleys connecting said axles to a source of motive power, said belts and pulleys being mounted exclusively on a first longitudinal side of said frame.

10. Apparatus as defined in claim 9 wherein said means for lifting is supported in non contacting relation to said flooring and further comprising means affixed to said frame for varying the height of said means for lifting above said flooring.

11. A poultry house cleaner for use in combination with a towing vehicle which supplies motive power thereto comprising, in combination:

a. a longitudinal frame mounted on a plurality of wheels;
   b. an inclined bar conveyor mounted on said frame at a forward end thereof;
   c. means adjacent said bar conveyor mounted on said frame for lifting particulate matter from the flooring of said poultry house onto said bar conveyor;
   d. means for connecting said frame to a towing vehicle at a point such that the height of said lifting means is adjustable relative to said point;
   e. a plurality of detachable plate like members underlying said bar conveyor along the inclination thereof such that said particulate matter is urged upwardly there along by said bar conveyor;
   f. a grate underlying said plurality of detachable plate like members in planar abutment therewith such that removal of one or more of said plate like members exposes said grate to particulate matter urged upwardly by said bar conveyor;
   g. a hopper, having a bottom and a longitudinal conveyor extending along said bottom for dispersing said particulate matter deposited therein, supported on said frame rearwardly of said inclined grate for receiving a waste fraction of said particulate matter urged upwardly by said bar conveyor; and
   h. a plurality of belts and pulleys connecting axles adapted for driving said inclined conveyor and said longitudinal conveyor to a source of motive power, said belts and pulleys being mounted exclusively on a first longitudinal side of said frame.

12. Apparatus as defined in claim 11 wherein said grate comprises a plurality of parallel rods extending along the angle of inclination of said grate in spaced relation to one another such that a portion of said particulate matter of a predetermined size falls through interstices between said parallel rods.

13. A poultry house cleaner as defined in claim 12 further comprising a gate mounted on a rear wall of said hopper movable selectively to an open and a closed position, said longitudinal conveyor being cooperatively positioned to selectively discharge particulate matter when said gate is in said open position.

14. A poultry house cleaner as defined in claim 13 further comprising means mounted to said frame rearwardly of said gate in cooperative relation thereto for horizontally dispersing particulate matter urged through said gate by said longitudinal conveyor.

15. A poultry house cleaner as defined in claim 13 wherein said gate is adjustable in height to selected positions such to define a metering opening relative to said longitudinal conveyor such that particulate matter discharged therethrough is metered by the position of said gate.

* * * * *